(12) United States Patent
Kalkowski (10) Patent No.: US 12,022,784 B2
(45) Date of Patent: Jul. 2, 2024

(54) PLANT POT WITH REMOVABLE BASIN

(71) Applicant: Kristopher John Kalkowski, Las Vegas, NV (US)

(72) Inventor: Kristopher John Kalkowski, Las Vegas, NV (US)

( * ) Notice: Subject to any disclaimer, the term of this patent is extended or adjusted under 35 U.S.C. 154(b) by 66 days.

(21) Appl. No.: 17/724,107

(22) Filed: Apr. 19, 2022

(65) Prior Publication Data
US 2022/0330490 A1 Oct. 20, 2022

Related U.S. Application Data (60) Provisional application No. 63/176,865, filed on Apr. 19, 2021.

(51) Int. Cl.
*A01G 9/04* (2006.01)

(52) U.S. Cl.
CPC .................................. *A01G 9/042* (2013.01)

(58) Field of Classification Search
CPC ........ A01G 9/042; A01G 9/023; A01G 9/028; A01G 9/0295; A01G 27/02; A01G 27/006
See application file for complete search history.

(56) References Cited

U.S. PATENT DOCUMENTS

| | | | |
|---|---|---|---|
| 167,790 A | 9/1875 | Sands | |
| 1,487,231 A | 3/1924 | Rady | |
| 4,175,354 A | 11/1979 | Anderson | |
| 5,535,546 A | 7/1996 | Krivonos | |
| 6,345,470 B1 * | 2/2002 | Slaght | A01G 27/02 47/79 |
| 7,093,391 B2 | 8/2006 | Eakin | |
| 8,261,486 B2 | 9/2012 | Bissonnette et al. | |
| 9,185,853 B1 * | 11/2015 | Ascherman | A01G 9/02 |
| 9,474,214 B2 | 10/2016 | Cudmore | |
| 10,264,735 B2 | 4/2019 | Cudmore | |
| 2008/0083163 A1 | 4/2008 | Amsellem et al. | |
| 2008/0141586 A1 | 6/2008 | Hong | |
| 2015/0007497 A1 | 1/2015 | Delp, II | |
| 2018/0014472 A1 * | 1/2018 | Guillory | A01G 9/042 |
| 2020/0008374 A1 * | 1/2020 | Coleman | A01G 31/02 |
| 2021/0127606 A1 * | 5/2021 | Graffius | A01G 27/02 |
| 2021/0251162 A1 * | 8/2021 | Wells | A01G 27/02 |
| 2022/0095558 A1 * | 3/2022 | Allen | A01G 27/02 |
| 2022/0159913 A1 * | 5/2022 | Cook | A01G 27/008 |

FOREIGN PATENT DOCUMENTS

| | | |
|---|---|---|
| CN | 2403230 Y | 11/2000 |
| JP | 6187842 B1 | 8/2017 |

* cited by examiner

*Primary Examiner* — Trinh T Nguyen
(74) *Attorney, Agent, or Firm* — Dickinson Wright PLLC; Kevin D. Everage (57) ABSTRACT

A plant pot assembly including a pot portion. At least one sidewall extends upward from a sidewall bottom section to an upper rim and a dividing that, with the bottom section, upper rim, and sidewalls defines a soil cavity and basin cavity. The dividing structure defines a drain aperture connecting the soil cavity and the basin cavity. A basin portion includes a basin floor, a basin front, a basin back, at least one basin sidewall, and an elevated portion. The at least one sidewall defines an opening in the basin cavity whereby the basin portion may be inserted into the basin cavity. In a first basin position, the fluid may flow from the soil cavity, through the drain aperture, and into the basin cavity. In a second basin position, the fluid may not flow from the soil cavity into the basin cavity.

20 Claims, 8 Drawing Sheets

PLANT POT WITH REMOVABLE BASIN

CROSS-REFERENCE TO RELATED APPLICATIONS

This application claims priority to U.S. Provisional Application Ser. No. 63/176,865, filed Apr. 19, 2021, the entirety of which is incorporated herein by reference.

TECHNICAL FIELD

This disclosure relates to a plant pot assembly and, in particular, to a plant pot assembly with a removable basin.

BACKGROUND

This section provides background information related to the present disclosure which is not necessarily prior art.

Nature provides one of the most captivating and effective mood enhancements. People have traditionally traveled to various geographies to experience various-types of alluring flora and fauna. In addition to mood enhancement, many types of plants include fruits, seeds, and other portions that are edible and rich in healthy nutrients.

Many individuals also enjoy the processes of cultivating their own plants in controlled or semi-controlled environments. One common device that is used internationally is a plant pot. Plant pots can be constructed from a variety of materials e.g., synthetic, clay. Plant pots, particularly those used in indoor environments, typically include a bowl portion that contains soil and a basin portion that the bowl portion can seat within. The bowl portion includes a bottom with a hole such that, in use, water can be placed in the bowl portion to sufficiently wet the roots and can slowly leak out of the hole and into the basin to ensure the plant is not overwatered. While plant pots with both the bowl and the basin portion have enabled many individuals to grow and sustain plants indoors, they are not without shortcomings. For example, emptying the basin of excess water requires lifting and removal of the plant pot and carrying of the basin to where it can be emptied. Thus emptying the basin can be time consuming, messy, and require lifting the plant pot, which can be very heavy.

Accordingly, there is a continued interest in the development of the plant pots with basins, such that the plant can be easily and efficiently watered and the basin can be easily removed for emptying.

SUMMARY

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

According to one aspect of the disclosure, a plant pot assembly is provided. The plant pot assembly includes a pot portion including at least one sidewall extending upwardly from a sidewall bottom section to an upper rim, and a dividing structure spaced between the sidewall bottom section and upper rim. The dividing structure, upper rim, and sidewalls define a soil cavity. The dividing structure, bottom section, and the at least one sidewall define a basin cavity. The dividing structure defines a drain aperture connecting the soil cavity and the basin cavity. The plant pot assembly further comprises a basin portion including a basin floor, a basin front, a basin back, at least one basin sidewall, a guiding wall and a drain aperture plug apparatus including a plug member extending from the quinine wall. The at least one sidewall defines an opening in the basin cavity whereby the basin portion is removably inserted into the basin cavity. In a first basin position in which the basin portion is disposed within the basin cavity, the basin front is recessed relative to the at least one sidewall and the plug member contacts the drain aperture such that a fluid in the soil cavity may not pass between the soil cavity and the basin cavity. In a second basin position in which the basin portion is also disposed within the basin cavity, the basin front is flush with the at least one sidewall and the plug member does not contact the drain aperture such that a fluid in the soil cavity may pass between the soil cavity and the basin cavity through the drain aperture.

According to one aspect of the disclosure, a plant pot assembly is provided. The plant pot assembly includes a pot portion including at least one sidewall extending upwardly from a sidewall bottom section to an upper rim, and a dividing structure spaced between the sidewall bottom section and upper rim. The dividing structure, upper rim, and sidewalls define a soil cavity. The dividing structure, bottom section, and sidewalls define a basin cavity. The dividing structure defines a drain aperture connecting the soil cavity and the basin cavity. A basin portion includes a basin floor, a basin front, a basin back, at least one basin sidewall, and a guiding wall with an elevated portion. The at least one sidewall defines an opening in the basin cavity whereby the basin portion is removably inserted into the basin cavity. A drain plug apparatus is connected to the dividing structure and is configured to selectively plug the drain aperture. In a first basin position in which the basin portion is disposed within the basin cavity, the basin front is recessed relative to the at least one sidewall and the elevated portion contacts the drain plug apparatus such that the drain plug apparatus plugs the drain aperture and a fluid in the soil cavity may not pass between the soil cavity and the basin cavity. In a second basin position in which the basin portion is also disposed within the basin cavity, the basin front is flush with the at least one sidewall and the elevated portion does not cause the drain plug apparatus to plug the drain aperture such that a fluid in the soil cavity may pass between the soil cavity and the basin cavity through the drain aperture.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The disclosure is best understood from the following detailed description when read in conjunction with the accompanying drawings. It is emphasized that, according to common practice, the various features of the drawings are not to-scale unless otherwise indicated. Thus, unless otherwise indicated, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, plant pots, particularly those used in indoor environments, typically include a bowl portion that contains soil and a basin portion that the bowl portion can seat within. The bowl portion includes a bottom with a hole such that, in use, water can be placed in the bowl portion to sufficiently wet the roots and can slowly leak out of the hole and into the basin to ensure the plant is not overwatered. While plant pots with both the bowl and the basin portion have enabled many individuals to grow and sustain plants indoors, they are not without shortcomings. For example, emptying the basin of excess water requires lifting and removal of the plant pot and carrying of the basin where it can be emptied. Thus emptying the basin can be time consuming, messy, and require lifting the plant pot, which can be very heavy.

Accordingly, plant pot assemblies, such as those described herein, configured to provide a structure wherein plants can be easily and efficiently watered and a basin component can be easily removed for emptying, may be desirable. In some embodiments, the plant pot assembly described herein may be configured to provide a structure with an easily removable basin and a chimney feature to ease watering.

Figure 1A:
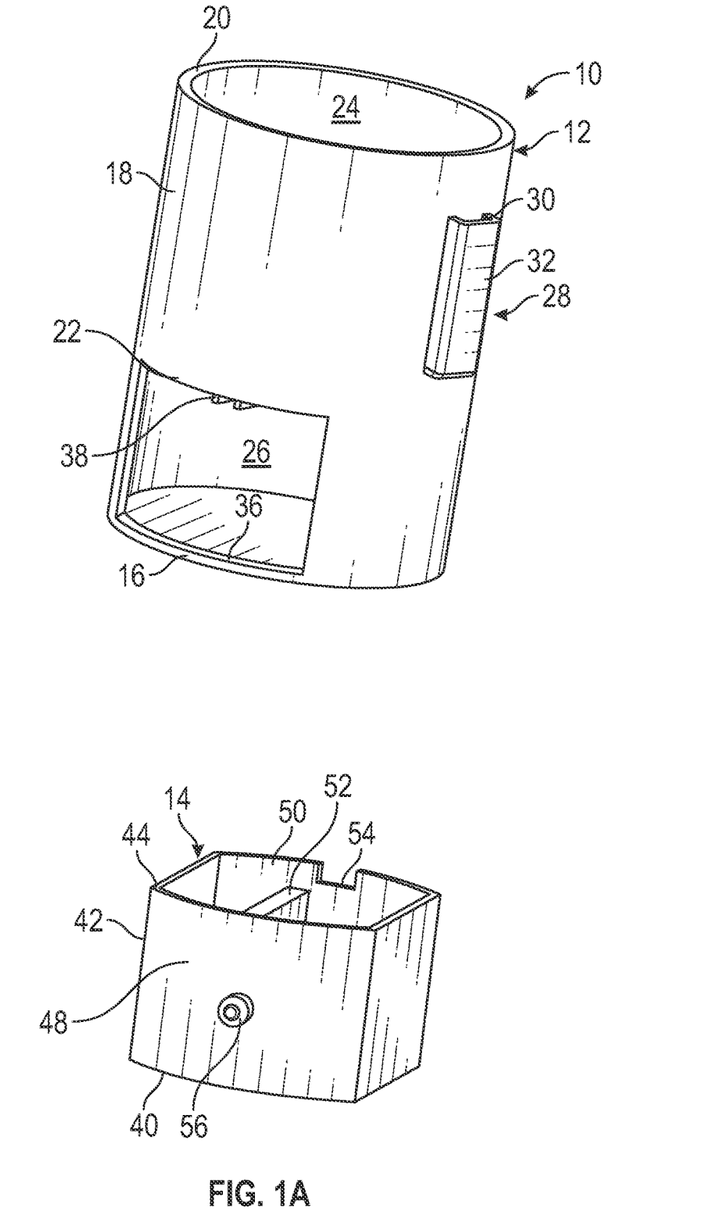
FIGS. 1A and 1B are perspective illustrations of first and second embodiments of plant pot assemblies, each including a basin removed therefrom in accordance with a first embodiment of the disclosure.
Figure 2:
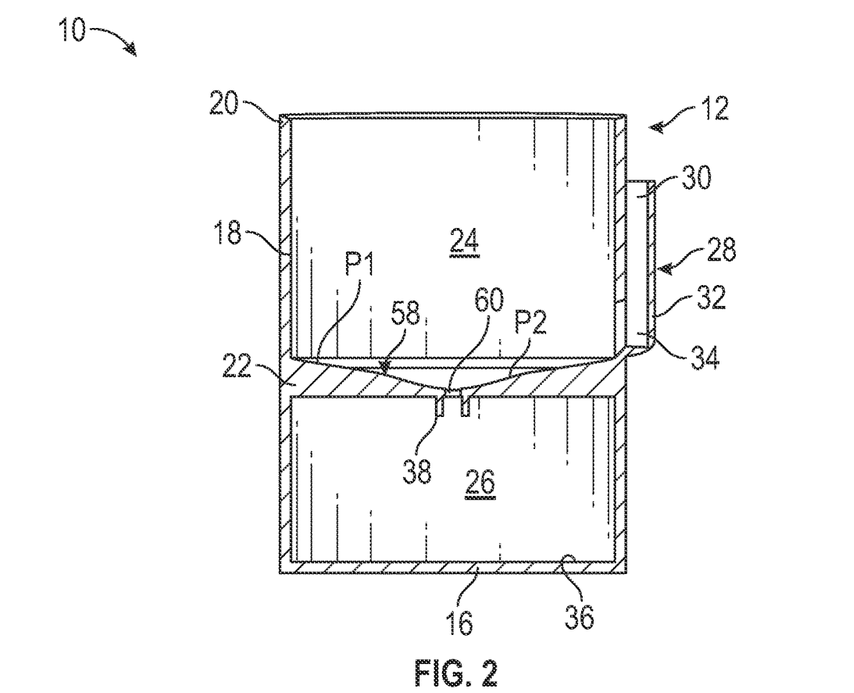
FIG. 2 is a front, cross-sectional illustration of the plant pot assembly in accordance with the first embodiment.

FIG. 1A illustrates a perspective view of a plant pot assembly 10 according to a first embodiment of the present disclosure. Unless otherwise indicated, the first embodiment may share all of the same features, elements, materials of construction, and functionalities of the other embodiments described herein. The plant pot assembly 10 may include any number of shapes and configurations and may be constructed out of any number of materials such as synthetic, clay, glass, or combinations thereof. The plant pot assembly 10 includes a pot portion 12 and a basin portion 14 selectively received within the pot portion 12. More particularly, the pot portion 12 includes a base 16 and at least one sidewall 18 extending upwardly from the base 16 to an upper rim 20. The at least one sidewall 18 may define a cylindrical shape. A dividing structure 22 is spaced between the base 16 and the upper rim 20. A soil cavity 24 is defined between the at least one sidewall 18, the dividing structure 22, and the upper rim 20. A basin cavity 26 is defined between the at least one sidewall 18, the dividing structure 22, and the base 16. A chimney 28 includes an entry port 30 and a body 32 that extends down to an exit port 34 (FIG. 2). In some embodiments, the exit port 34 is located closer to the dividing structure 22 than the entry port 30. In some embodiments, the entry port 30 is flush with the upper rim 20 or located closer to the upper rim 20 than the dividing structure 22. In some embodiments, the chimney 28 is integral with the at least one sidewall 18.

With continued reference to FIG. 1A, the at least one sidewall 18 defines an opening 36 in the basin cavity 26 sized to permit the basin portion 14 to be placed into and removed from the basin cavity 26. An undersurface of the dividing structure 22 includes a first guiding structure, for example, at least one rail 38 for aligning the basin portion 14 within the basin cavity 26. In some embodiments, the at least one rail 38 includes a pair of rails 38 parallelly aligned and defining a guiding track therebetween. In some embodiments, the first guiding structure may be located on the sidewall 18, the base 16, the dividing structure 22, or combinations thereof. In some embodiments, the first guiding structure may include a groove, a shaped surface, or a combination thereof.

The basin portion 14 includes a basin floor 40 and at least one basin sidewall 42 extending up from the basin floor 40 to a basin rim 44. The basin floor 40 and the at least one basin sidewall 42 define a water cavity 46 that collects excess water from the soil cavity 24. The at least one basin sidewall 42 defines a basin front 48 and a basin back 50 spaced oppositely from the basin front 48. In some embodiments, the basin front 48 has a shape that is continuous with the at least one sidewall 18 of the pot portion 12. For example, the basin front 48 and the at least one sidewall 18 of the pot portion 12 may define a circular, oblong, triangular, hexagonal, rectilinear, or other contiguous cross-sectional shapes.

The basin portion 14 includes a second guiding structure, for example, at least one guiding wall 52 that extends between the basin front 48 and the basin back 50. The guiding wall 52 may be sized to fit between and be guided by the pair of rails 38. In some embodiments, the guiding wall 52 extends from the basin front 48 and terminates before reaching the basin back 50. In some embodiments, the guiding wall 52 extends from the basin front 48 to the basin back 50. In some embodiments, the second guiding structure may by located on an under surface of the basin floor, on the basin sidewall 42, or a combination thereof. In some embodiments, the guiding wall 52 is flush with the basin rim 44 and extends to the basin floor 40. The basin portion 14 may further include a cutout 54 for accommodating the first guiding structure (e.g., rails 38). In some embodiments, the cutout 54 is sized to be similarly sized to an outer surface of the pair of rails 38 such that it further assists in guiding the basin portion 14 into the basin cavity 26. In some embodiments, the cutout 54 is sized to permit roots to travel out of the cutout 54 as the basin portion 14 is removed from the basin cavity 26. An outer surface of the basin front 48 may include a handle 56 to assist in the removal and entry of the basin portion 14 relative to the basin cavity 26.

Figure 1B:
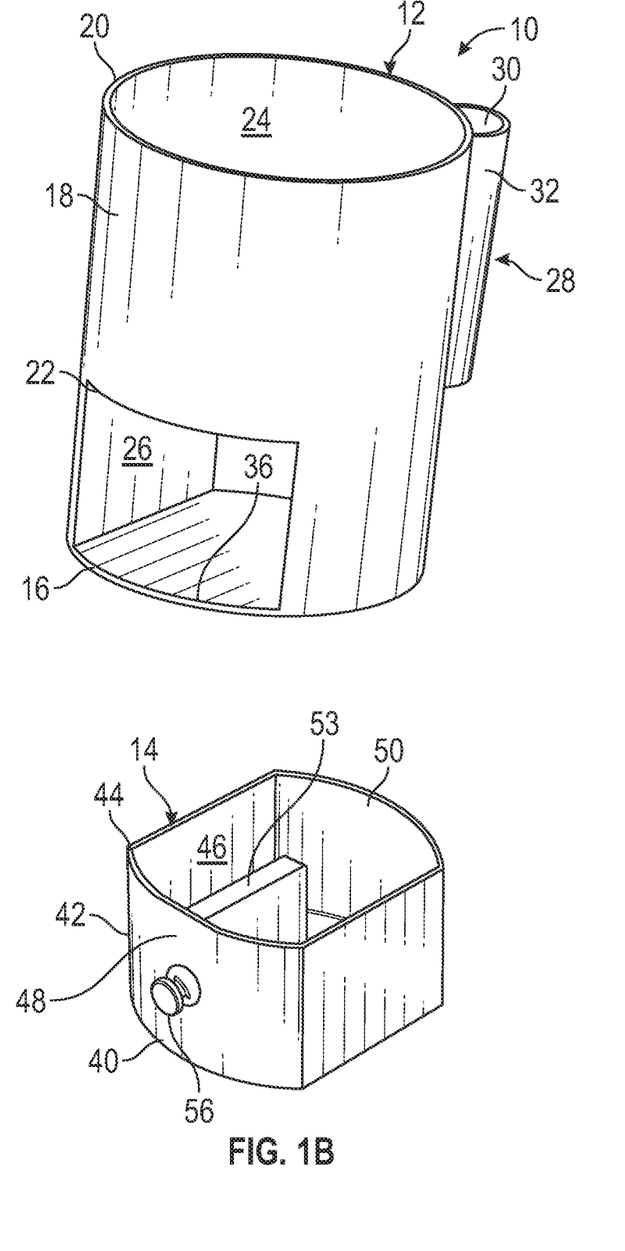

FIG. 1B illustrates a perspective view of a plant pot assembly 10 according to a second embodiment of the present disclosure. Unless otherwise indicated, the second embodiment may share all of the same features, elements, materials of construction, and functionalities of the other embodiments described herein. The plant pot assembly 10 may include any number of shapes and configurations and may be constructed out of any number of materials such as synthetic, clay, glass, or combinations thereof. The plant pot assembly 10 includes a pot portion 12 and a basin portion 14 selectively received within the pot portion 12. More particularly, the pot portion 12 includes a base 16 and at least one sidewall 18 extending upwardly from the base 16 to an upper rim 20. The at least one sidewall 18 may define a cylindrical shape. A dividing structure 22 is spaced between the base 16 and the upper rim 20. A soil cavity 24 is defined between the at least one sidewall 18, the dividing structure 22, and the upper rim 20. A basin cavity 26 is defined between the at least one sidewall 18, the dividing structure 22, and the base 16. A chimney 28 includes an entry port 30 and a body 32 that extends down to an exit port 34 (FIG. 2). In some embodiments, the exit port 34 is located closer to the dividing structure 22 than the entry port 30. In some embodiments, the entry port 30 is flush with the upper rim 20 or located closer to the upper rim 20 than the dividing structure 22. In some embodiments, the chimney 28 is integral with the at least one sidewall 18.

With continued reference to FIG. 1B, the at least one sidewall 18 defines an opening 36 in the basin cavity 26 sized to permit the basin portion 14 to be placed into and removed from the basin cavity 26. In some embodiments, the first guiding structure may be located on the sidewall 18, the base 16, the dividing structure 22, or combinations thereof. In some embodiments, the first guiding structure may include a groove, a shaped surface, or a combination thereof.

The basin portion 14 includes a basin floor 40 and at least one basin sidewall 42 extending up from the basin floor 40 to a basin rim 44. The basin floor 40 and the at least one basin sidewall 42 define a water cavity 46 that collects excess water from the soil cavity 24. The at least one basin sidewall 42 defines a basin front 48 and a basin back 50 spaced oppositely from the basin front 48. In some embodiments, the basin front 48 has a shape that is continuous with the at least one sidewall 18 of the pot portion 12. For example, the basin front 48 and the at least one sidewall 18 of the pot portion 12 may define a circular, oblong, triangular, hexagonal, rectilinear, or other contiguous cross-sectional shapes.

The basin portion 14 may include a central wall 53 that extends between the basin front 48 and the basin back 50. In some embodiments, the central wall 53 extends from the basin front 48 and terminates before reaching the basin back 50. In some embodiments, the central wall 53 extends from the basin front 48 to the basin back 50. In some embodiments, the second guiding structure may by located on an under surface of the basin floor, on the basin sidewall 42, or a combination thereof. In some embodiments, the guiding wall 52 is flush with the basin rim 44 and extends to the basin floor 40. An outer surface of the basin front 48 may include a handle 56 to assist in the removal and entry of the basin portion 14 relative to the basin cavity 26.

Figure 3:
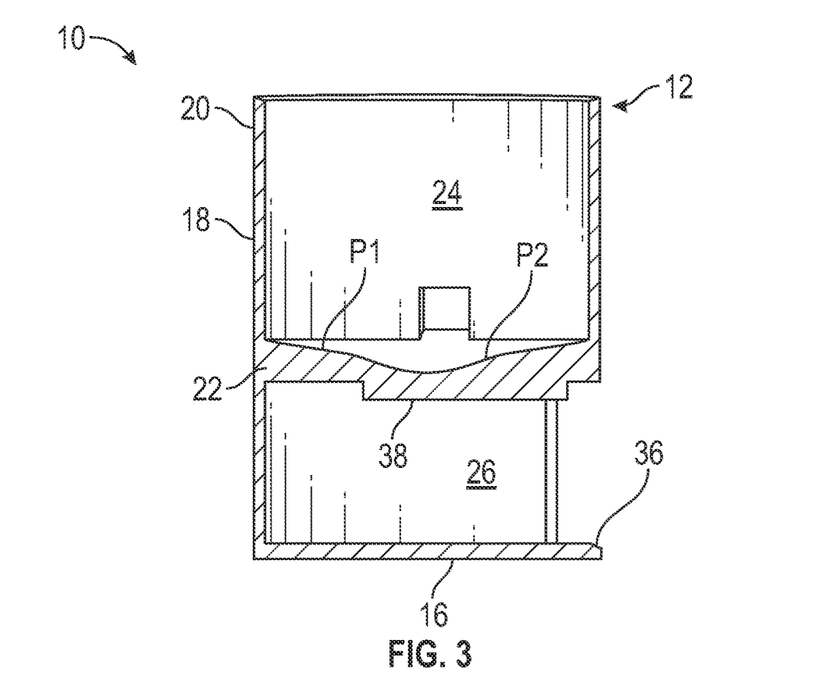
FIG. 3 is a side, cross-sectional illustration of the plant pot assembly in accordance with the first embodiment.

FIG. 2 is a front, cross-sectional view of the plant pot assembly 10 in accordance with the first embodiment illustrating additional features. More particularly, a top surface of the dividing structure 22 that faces the rim 20 includes a depression 58 that depresses from the at least one sidewall 18 to a central location that defines a drain aperture 60. In use, the depression 58 guides liquid on the top surface of the dividing structure 22 to the drain aperture 60 to prevent accumulation that can be harmful to plants. In some embodiments, the depression 58 includes a first pitch P1 located adjacent to the at least one sidewall and a second pitch P2 located around and adjacent to the drain aperture 60. In some embodiments, the first pitch P1 is less than the second pitch P2. In some embodiments, the depression 58 defines a concave surface with at least one section of a continuously variable pitch and/or arch-shaped pitch. FIG. 3 is a side, cross-sectional illustration of the pot portion 12 illustrating the location of the rails 38. More particularly, the rails 38 may extend towards but terminate in a spaced relationship from the opening 36. The spacing between the rails 38 and the opening 36 may be equal or substantially equal to a thickness of the basin sidewall 48 defining the basin front 42, such that the basin front 48 is flush with an outer surface of the at least one sidewall 18 of the pot portion 12.

Figure 4:
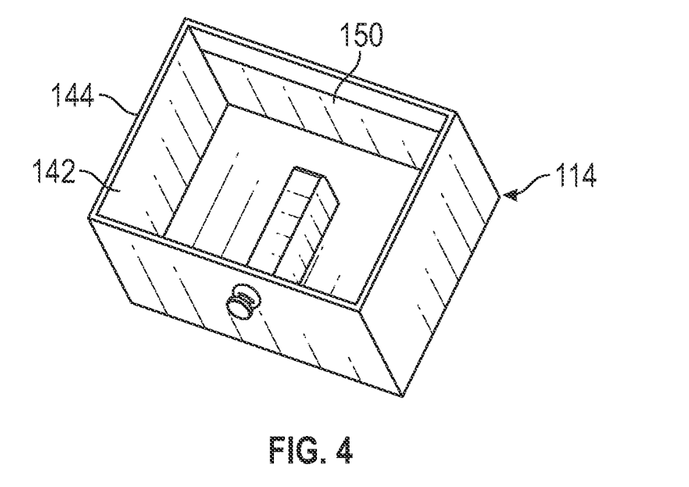
FIG. 4 is a perspective illustration of a plant pot assembly including a basin removed therefrom in accordance with a second embodiment of the disclosure.

FIG. 4 is a perspective illustration of a plant pot assembly 110 in accordance with a second embodiment of the disclosure. Unless otherwise indicated, the second embodiment may share all of the same features, elements, materials of construction, and functionalities of the other embodiments described herein. The plant pot assembly 110 includes a pot portion 112 and a basin portion 114. The pot portion 112 may include a sidewall 118 defining a cube or cuboid shape and the basin portion 114 may likewise include a basin sidewall 142 defining a cube or cuboid shape. In some embodiments, a basin back surface 150 adjacent to a basin rim 144 is recessed for accommodating a first guiding structure and/or roots.

Figure 5:
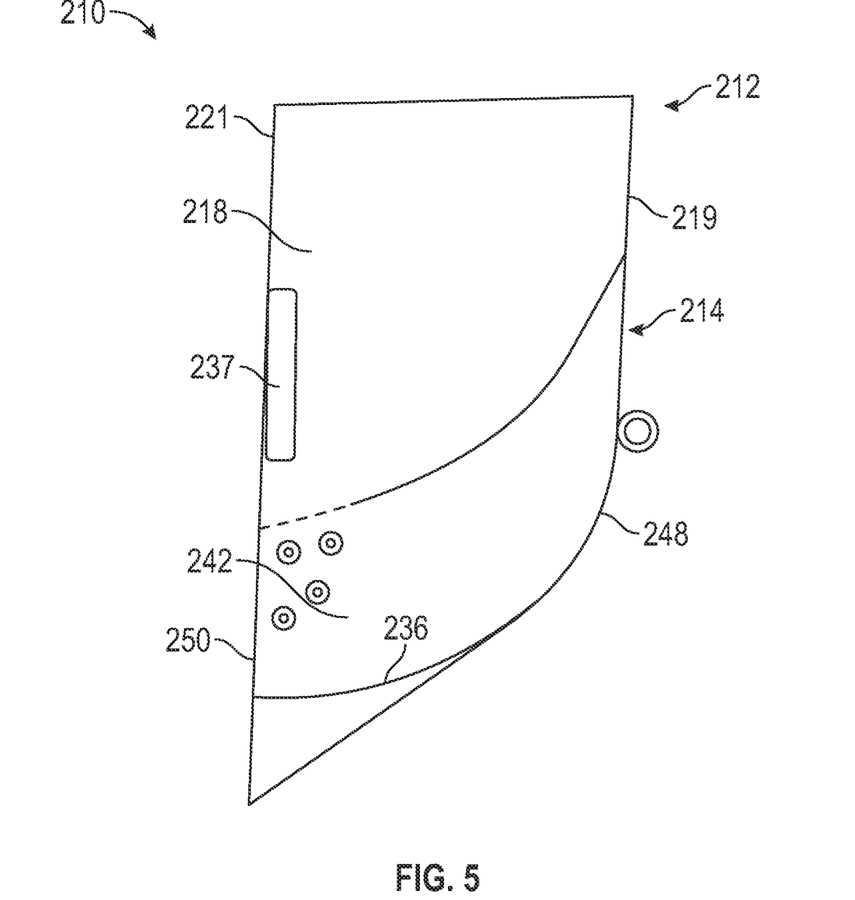
FIG. 5 is a side illustration of a plant pot assembly including a basin therein in accordance with a third embodiment of the disclosure.

FIG. 5 is a side illustration of a plant pot assembly 210 in accordance with a third embodiment of the disclosure. Unless otherwise indicated, the third embodiment may share all of the same features, elements, materials of construction, and functionalities of the other embodiments described herein. The plant pot assembly 210 includes a pot portion 212 and a basin portion 214. The pot portion 212 may include a sidewall 218 defining a curved front surface 219 and a flat back surface 221 and the basin portion 214 may likewise include a basin sidewall 242 defining basin front surface 248 that is curved and a basin back surface 250 that is flat. In some embodiments, the at least one sidewall 218 begins to taper at or near a basin opening 236 to a bottom surface. In some embodiments, the plant pot assembly 210 may further include at least one connection feature 237, such as a hook, strap, adhesive, fastener aperture, or combinations thereof. As such, the flat back surface 221 can sit flushly on a wall or other structure and connect thereto with the connection feature 237.

Figure 6:
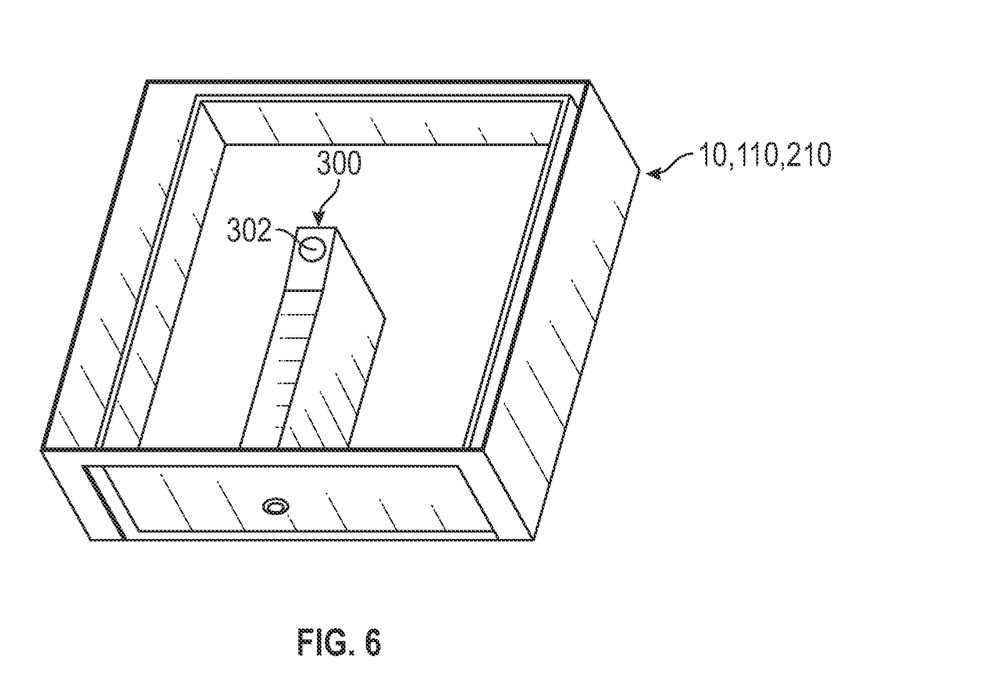
FIG. 6 is a perspective illustration of a basin including a drain aperture plug apparatus in accordance with one embodiment.

FIGS. 6 through 11 illustrate various embodiments of a drain aperture plug apparatus that selectively prevents fluid from flowing from the soil chamber 24 and into the water cavity 46. The various drain aperture plug apparatus may be configured to plug the drain aperture when the basin portion is removed from the pot portion and/or when the basin portion is located in the pot portion. It should be appreciated that the each of the following embodiments of the drain aperture plug apparatus could be implemented in any of the described plant pot assembly embodiments. In some embodiments, the first guiding structure and the second guiding structure may be configured to locate the drain aperture plug apparatus against the drainage aperture. With reference to FIG. 6, a basin including a drain aperture plug apparatus 300 is illustrated in accordance with a first embodiment. The drain aperture plug apparatus 300 includes a plug member 302 extending from a guiding wall of the basin portion towards the drainage aperture. The plug member 302 may be elastic and deformable to seal the drainage aperture. In a first basin position in which the basin portion 14 is disposed within the basin cavity 26, the basin front 48 is recessed relative to the at least one sidewall 18 and the plug member 302 contacts the drainage aperture 60 such that a fluid in the soil cavity 24 may not pass between the soil cavity 24 and the water cavity 46. In a second basin position in which the basin portion 14 is disposed within the basin cavity 26, the basin front 48 is flush with the at least one sidewall 18 and the plug member 302 does not plug the drain aperture 60 such that a fluid in the soil cavity 24 may pass between the soil cavity 24 and the water cavity 46 through the drainage aperture 60.

Figure 7:
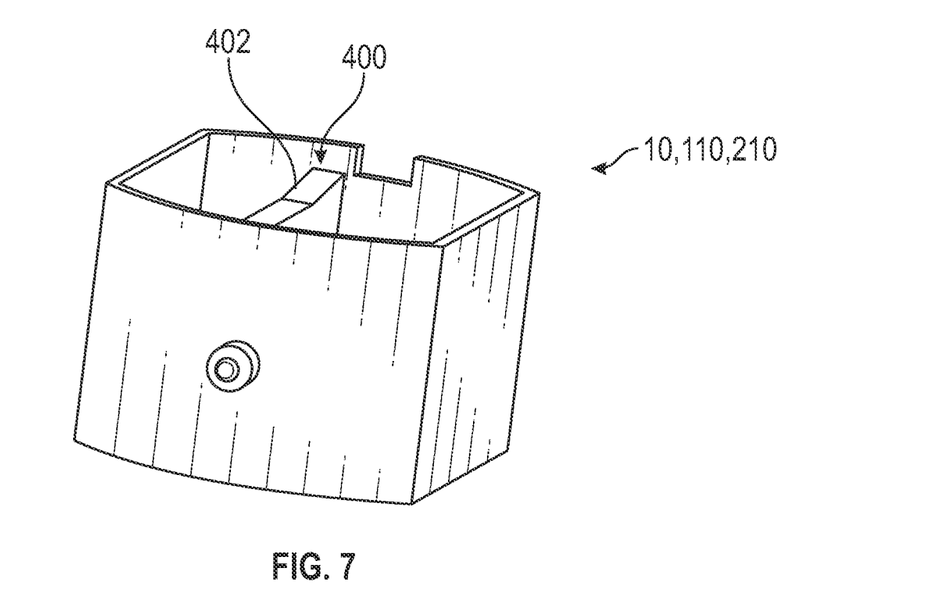
FIG. 7 is a perspective illustration of the basin including a drain aperture plug apparatus in accordance with another embodiment.

FIG. 7 is a perspective illustration of a drain aperture plug apparatus 400 in accordance with a second embodiment. The drain aperture plug apparatus 400 includes an elevated portion 402 extending from a guiding wall of the basin portion towards the drainage aperture. The elevated portion 402 may be elastic and deformable to seal the drainage aperture. In a first basin position in which the basin portion 14 is disposed within the basin cavity 26, the basin front 48 is recessed relative to the at least one sidewall 18 and the elevated portion 402 contacts the drainage aperture 60 such that a fluid in the soil cavity 24 may not pass between the soil cavity 24 and the water cavity 46. In a second basin position in which the basin portion 14 is disposed within the basin cavity 26, the basin front 48 is flush with the at least one sidewall 18 and the elevated portion 402 does not plug the drain aperture 60 such that a fluid in the soil cavity 24 may pass between the soil cavity 24 and the water cavity 46 through the drainage aperture 60.

Figure 8:
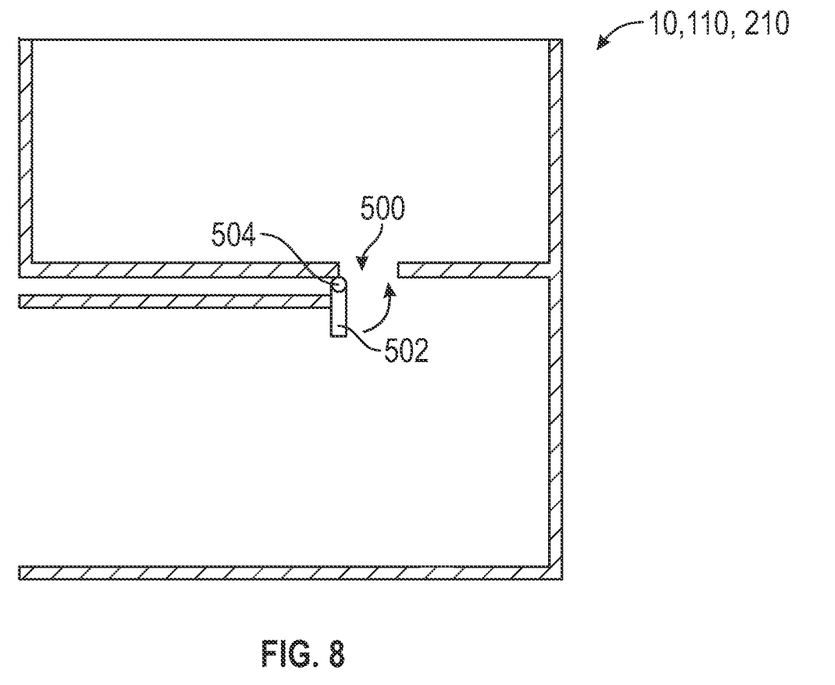
FIG. 8 is a perspective illustration of the basin including a drain aperture plug apparatus in accordance with another embodiment.

FIG. 8 is a perspective illustration of a drain aperture plug apparatus 500 in accordance with a third embodiment. The drain aperture plug apparatus 500 includes a door 502 pivotable on a hinge 504 between an open and closed position and extending from a dividing structure of the pot portion towards the drainage aperture. The door 502 may be elastic and deformable to seal the drainage aperture. In operation, the door 502 may be located adjacent to the first guiding structure (e.g., between rails 38) and as the second guiding structure contacts the door 502, it is pivoted to the closed position wherein the drainage aperture is plugged. In some embodiments, the second guiding structure includes a ramp (e.g., ramped portion 402) such that the rate of drainage can be controlled.

Figure 9:
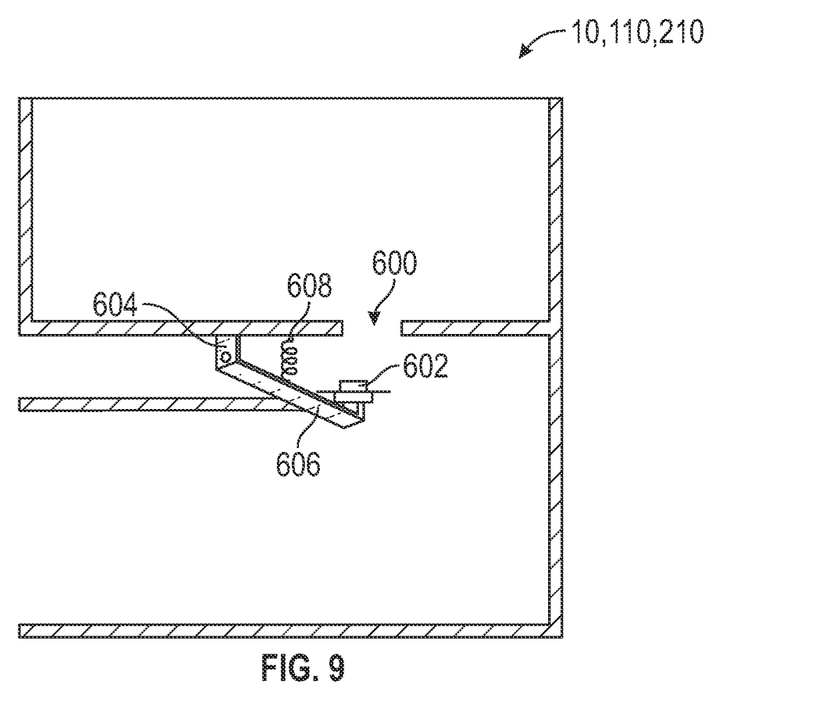
FIG. 9 is a perspective illustration of the basin including a drain aperture plug apparatus in accordance with another embodiment.

FIG. 9 is a perspective illustration of a drain aperture plug apparatus 600 in accordance with a fourth embodiment. The drain aperture plug apparatus 600 includes a plug 602 pivotally connected to a bracket 604 via a linkage 606. A spring 608 may connect the linkage 606 to the pot portion (e.g., dividing structure). The plug 602 may be elastic and deformable to seal the drainage aperture. In operation, the second guiding structure may contact the linkage 606 to lift the plug 602 into the drainage aperture.

Figure 10:
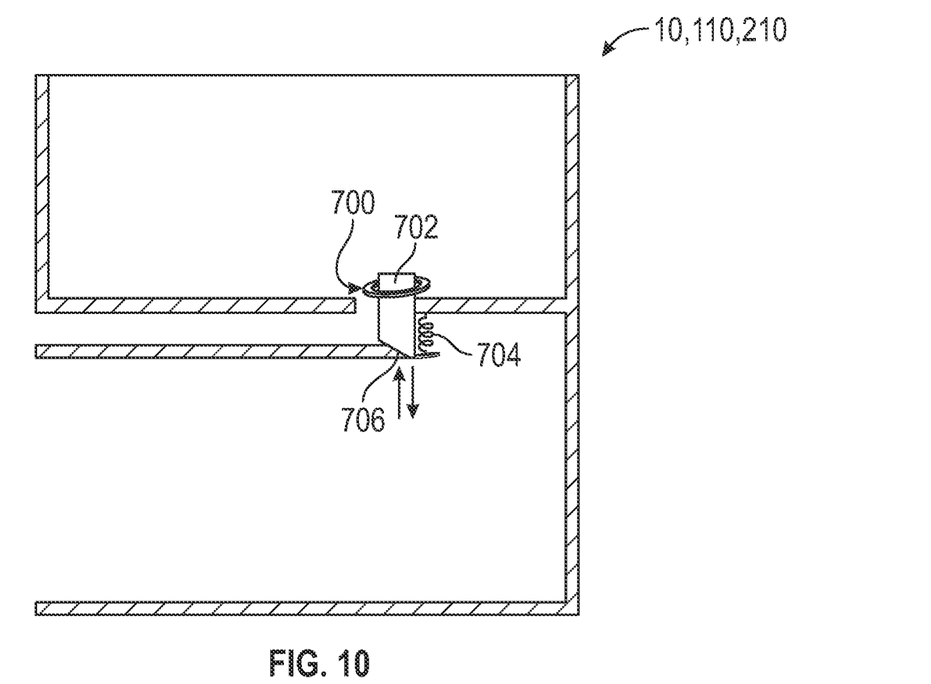
FIG. 10 is a perspective illustration of the basin including a drain aperture plug apparatus in accordance with another embodiment.

FIG. 10 is a perspective illustration of the basin including a drain aperture plug apparatus 700 in accordance with a fifth embodiment. The drain aperture plug apparatus 700 includes a plug 702 biased towards or away from the drain aperture via a spring 704. A bottom surface 706 of the plug 702 is ramped such that contact with the second guiding structure causes the plug 702 to enter or exit the drainage aperture. Thus in some embodiments, the spring 704 biases the plug 702 in the drainage aperture until the bottom surface 706 contacts the second guiding structure and lifts the plug 702 out of the drainage aperture to prevent leakage when the basin portion is removed. In some embodiments, the spring 704 biases the plug 702 away from the drainage aperture until the bottom surface 706 contacts the second guiding structure and lifts the plug 702 into the drainage aperture to prevent leakage when the basin portion is removed.

Figure 11:
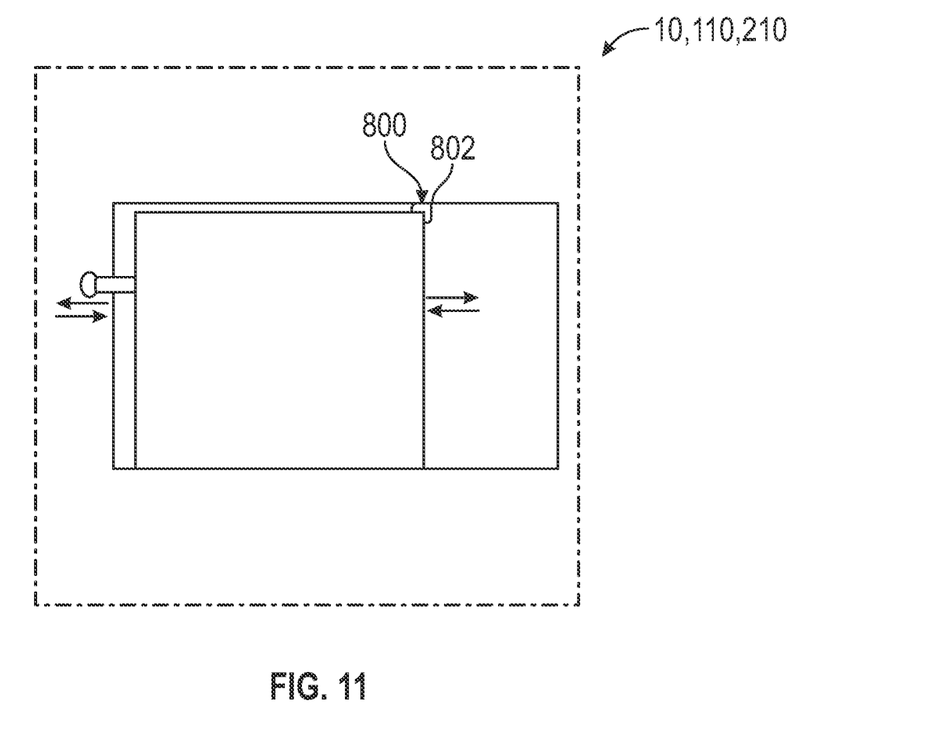
FIG. 11 is a perspective illustration of the basin including a drain aperture plug apparatus in accordance with another embodiment.

FIG. 11 is a perspective illustration of the basin including a drain aperture plug apparatus 800 in accordance with a sixth embodiment. The drain aperture plug apparatus 800 includes a sealing member 802 located on the dividing wall. The basin portion may be sized such that the sealing member 802 can be moved forward and rearward of the drainage aperture.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A plant pot assembly comprising:
a pot portion comprising at least one sidewall extending upwardly from a sidewall bottom section to an upper rim and a dividing structure spaced between the sidewall bottom section and upper rim;
the dividing structure, upper rim, and sidewalls defining a soil cavity;
the dividing structure, bottom section, and the at least one sidewall defining a basin cavity;
the dividing structure defining a drain aperture connecting the soil cavity and the basin cavity;
a basin portion comprising a basin floor, a basin front, a basin back, at least one basin sidewall, a guiding wall and a drain aperture plug apparatus including a plug member extending from the guiding wall;
the at least one sidewall defining an opening in the basin cavity whereby the basin portion is removably inserted into the basin cavity;
wherein, in a first basin position in which the basin portion is disposed within the basin cavity, the plug member contacts the drain aperture such that a fluid in the soil cavity may not pass between the soil cavity and the basin cavity; and
wherein, in a second basin position in which the basin portion is also disposed within the basin cavity, the plug member does not contact the drain aperture such that a fluid in the soil cavity may pass between the soil cavity and the basin cavity through the drain aperture.

2. The plant pot assembly of claim 1, wherein the plug member is elastic and deformable.

3. The plant pot assembly of claim 1, wherein the guiding wall extends from the basin front.

4. The plant pot assembly of claim 1, wherein the guiding wall from the basin rear.

5. The plant pot assembly of claim 1, wherein at least a portion of the drain aperture plug apparatus forms a ramp.

6. The plant pot assembly of claim 1, further comprising:
a chimney connected to the at least one sidewall and a chimney cavity, the chimney defining an entry port proximate to the upper rim; and
the sidewall defining an entry port proximate to the dividing structure and connecting the chimney cavity and the soil cavity.

7. The plant pot assembly of claim 1, wherein:
the pot portion further comprises a first guiding assembly; and
the basin portion further comprises a second guiding assembly configured to slidingly engage with the first guiding assembly.

8. The plant pot assembly of claim 7, wherein the guiding wall forms a portion of the second guiding assembly.

9. The plant pot assembly of claim 1, wherein the basin front is recessed relative to the at least one sidewall when the basin is in the first basin position and is flush with the at least one sidewall when the basin is in the second basin position.

10. A plant pot assembly comprising:
a pot portion comprising at least one sidewall extending upwardly from a sidewall bottom section to an upper rim and a dividing structure spaced between the sidewall bottom section and upper rim;
the dividing structure, upper rim, and sidewalls defining a soil cavity;
the dividing structure, bottom section, and sidewalls defining a basin cavity;
the dividing structure defining a drain aperture connecting the soil cavity and the basin cavity;
a basin portion comprising a basin floor, a basin front, a basin back, at least one basin sidewall, and a guiding wall with an elevated portion;
the at least one sidewall defining an opening in the basin cavity whereby the basin portion is removably inserted into the basin cavity;
a drain plug apparatus connected to the dividing structure and configured to selectively plug the drain aperture;
wherein, in a first basin position in which the basin portion is disposed within the basin cavity, the elevated portion contacts the drain plug apparatus such that the drain plug apparatus plugs the drain aperture and a fluid in the soil cavity may not pass between the soil cavity and the basin cavity; and
wherein, in a second basin position in which the basin portion is also disposed within the basin cavity, the elevated portion does not cause the drain plug apparatus to plug the drain aperture such that a fluid in the soil cavity may pass between the soil cavity and the basin cavity through the drain aperture.

11. The plant pot assembly of claim 10, wherein the drain plug apparatus further comprises a hinge and door connected to said hinge disposed proximate the drain aperture and such that under gravity, the door is biased into the basin portion, the door is urged to block the drain aperture when contacted by the elevated portion.

12. The plant pot assembly of claim 10, wherein the drain plug apparatus further comprises:
a bracket extending from the pot portion and into the basin cavity;
a linkage pivotably connected to the bracket;
a plug connected to the linkage;
a spring extending from the pot portion and configured to bias the plug away from the drain aperture; and
wherein contact between the elevated portion of the basin portion and the linkage urges the plug toward the dividing structure and into position to block the drain aperture.

13. The plant pot assembly of claim 12, wherein the bracket is connected to the dividing structure.

14. The plant pot assembly of claim 10, wherein the drain plug apparatus further comprises:
a plug having a ramped bottom;
a spring biasing the plug toward the drain aperture toward the drain aperture; and
wherein contact between the ramped bottom of the plug and the elevated portion urges the plug away from the drain aperture.

15. The plant pot assembly of claim 10, wherein the drain plug apparatus further comprises:
a plug having a ramped bottom;
a spring biasing the plug away from the drain aperture toward the drain aperture; and
wherein contact between the ramped bottom of the plug and the elevated portion urges the plug toward the drain aperture.

16. The plant pot assembly of claim 10, further comprising:
a chimney connected to the at least one sidewall and a chimney cavity, the chimney defining an entry port proximate to the upper rim; and
the sidewall defining an entry port proximate to the dividing structure and connecting the chimney cavity and the soil cavity.

17. The plant pot assembly of claim 10, wherein:
the pot portion further comprises a first guiding structure; and the basin portion further comprises a second guiding structure configured to slidingly engage with the first guiding assembly.

18. The plant pot assembly of claim 17, wherein the elevated portion forms a portion of the second guiding structure.

19. The plant pot assembly of claim 10, wherein the basin front is recessed relative to the at least one sidewall when the basin is in the first basin position and is flush with the at least one sidewall when the basin is in the second basin position.

20. The plant pot assembly of claim 10, wherein at least a portion of the elevated portion forms a ramp.

\* \* \* \* \*